United States Patent
Lewis et al.

(10) Patent No.: US 11,969,935 B2
(45) Date of Patent: Apr. 30, 2024

(54) VALVED NOZZLE WITH A COMPENSATOR AND MASSIVELY PARALLEL 3D PRINTING SYSTEM

(71) Applicant: President and Fellows of Harvard College, Cambridge, MA (US)

(72) Inventors: Jennifer A. Lewis, Cambridge, MA (US); Mark A. Skylar-Scott, Brookline, MA (US); Jochen Mueller, Dornhan (DE)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 229 days.

(21) Appl. No.: 16/467,394

(22) PCT Filed: Dec. 5, 2017

(86) PCT No.: PCT/US2017/064738
§ 371 (c)(1),
(2) Date: Jun. 6, 2019

(87) PCT Pub. No.: WO2018/106707
PCT Pub. Date: Jun. 14, 2018

(65) Prior Publication Data
US 2020/0086564 A1    Mar. 19, 2020

Related U.S. Application Data

(60) Provisional application No. 62/431,223, filed on Dec. 7, 2016.

(51) Int. Cl.
B29C 64/106 (2017.01)
B29C 48/02 (2019.01)
(Continued)

(52) U.S. Cl.
CPC ............ B29C 64/106 (2017.08); B29C 48/02 (2019.02); B29C 48/05 (2019.02); B29C 48/255 (2019.02);
(Continued)

(58) Field of Classification Search
CPC . B05B 11/3097; B29C 64/106; B29C 64/209; B67D 7/44; F16K 23/00; F16K 7/12; F16K 99/0015; B01L 2400/0655
(Continued)

(56) References Cited

U.S. PATENT DOCUMENTS 8,763,642 B2    7/2014  Vango
2010/0051124 A1  3/2010  Imran
(Continued)

FOREIGN PATENT DOCUMENTS

WO    WO 2016/164562 A1    10/2016
WO    WO 2016/168314 A1    10/2016

OTHER PUBLICATIONS

International Search Report and Written Opinion of the International Search Authority dated Feb. 12, 2018 in International Application No. PCT/US2017/064738 (8 pp.).

Primary Examiner — Ryan M Ochylski
Assistant Examiner — Ariella Machness
(74) Attorney, Agent, or Firm — Crowell & Moring LLP

(57) ABSTRACT

In one aspect, the present disclosure provides a nozzle for a 3D printing system. The nozzle may include a flowpath with a material inlet and a material outlet. The nozzle may further include a valve in fluid communication with the flowpath between the material inlet and the material outlet, where the valve includes a closed state and an open state, where in the closed state the valve obstructs the flowpath between the material inlet and the material outlet, and where in the open state the material inlet is in fluid communication with the (Continued)

material outlet. The nozzle may further include a compensator in fluid communication with the flowpath, where the compensator includes a contracted state associated with the open state of the valve and an expanded state associated with the closed state of the valve.

17 Claims, 15 Drawing Sheets

(51) Int. Cl.
| | |
|---|---|
| *B29C 48/05* | (2019.01) |
| *B29C 48/255* | (2019.01) |
| *B29C 48/285* | (2019.01) |
| *B29C 48/30* | (2019.01) |
| *B29C 48/92* | (2019.01) |
| *B29C 64/209* | (2017.01) |
| *B29C 64/321* | (2017.01) |
| *B33Y 10/00* | (2015.01) |
| *B33Y 30/00* | (2015.01) |
| *B33Y 40/00* | (2020.01) |

(52) U.S. Cl.
CPC ........ *B29C 48/2888* (2019.02); *B29C 48/298* (2019.02); *B29C 48/304* (2019.02); *B29C 48/92* (2019.02); *B29C 64/209* (2017.08); *B29C 64/321* (2017.08); *B33Y 10/00* (2014.12); *B33Y 30/00* (2014.12); *B33Y 40/00* (2014.12)

(58) Field of Classification Search
USPC .......................................................... 222/571
See application file for complete search history.

(56) References Cited

U.S. PATENT DOCUMENTS

| | | | |
|---|---|---|---|
| 2010/0187452 A1* | 7/2010 | Mukaddam | G01N 35/1097 222/255 |
| 2010/0319761 A1 | 12/2010 | Fork et al. | |
| 2015/0247580 A1* | 9/2015 | Au | F16K 99/0015 137/613 |
| 2016/0136885 A1 | 5/2016 | Nielsen-Cole et al. | |
| 2017/0232666 A1* | 8/2017 | Flitsch | B33Y 40/00 264/31 |
| 2018/0133670 A1* | 5/2018 | Lewis | B41J 2/211 |

* cited by examiner 1 px = 43μm

FIG. 5
FIG. 6
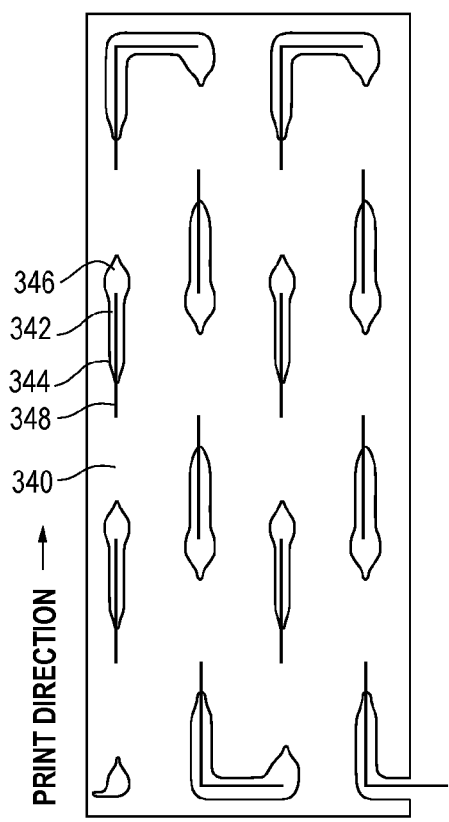
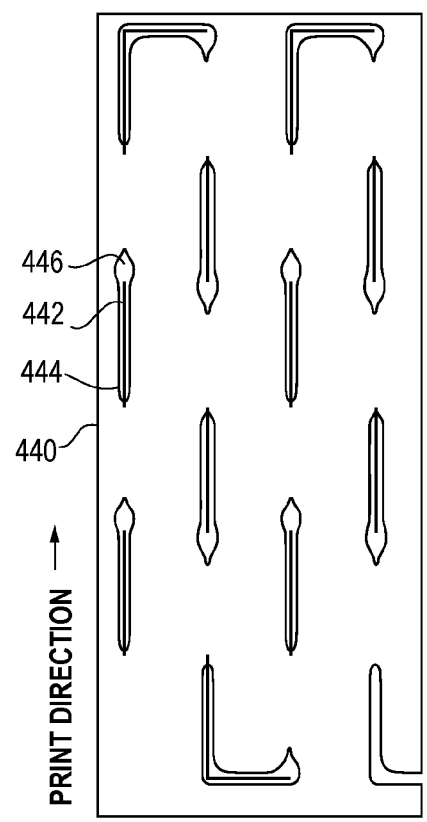

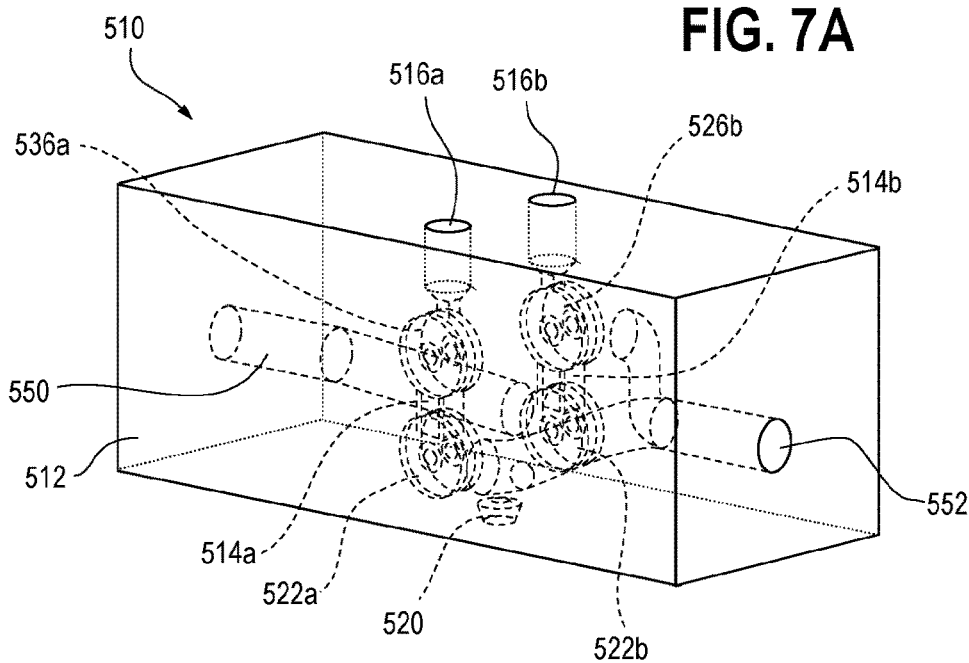
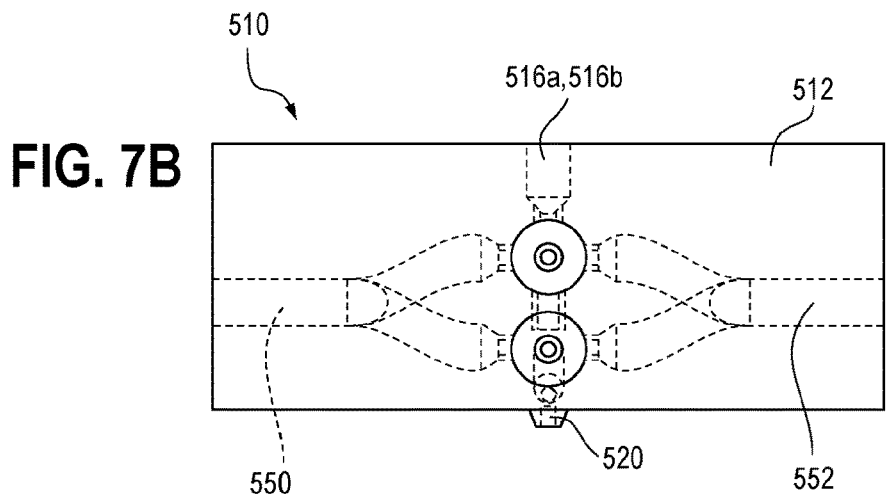
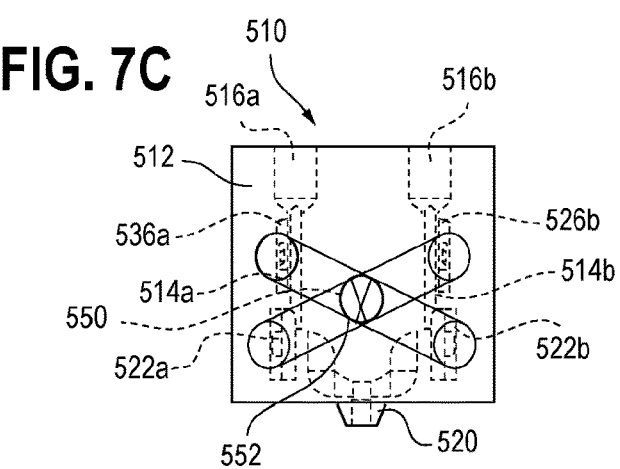

- SWITCHING DISTANCE: 1mm
- FEED RATE: 5 mm/s
- FREQUENCY: 5 Hz

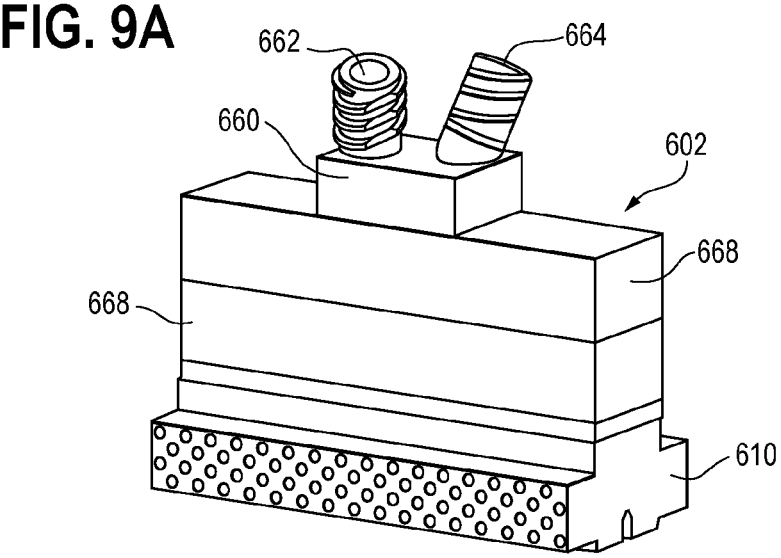
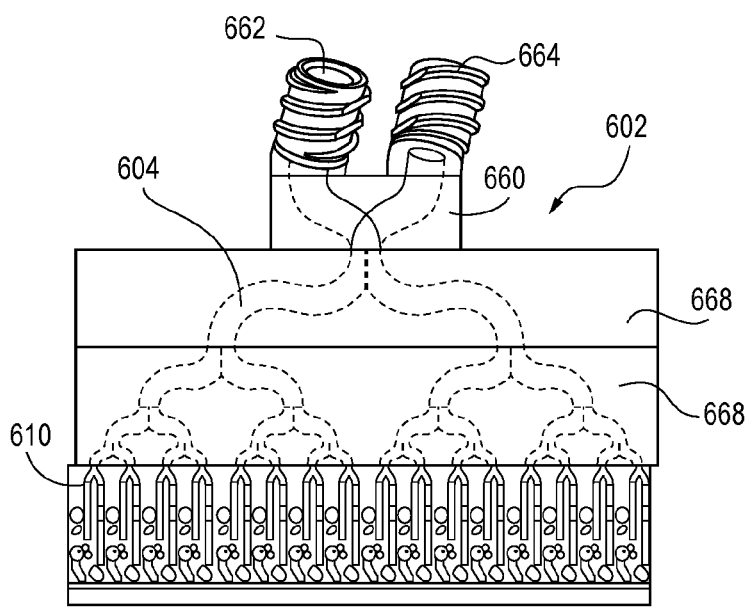
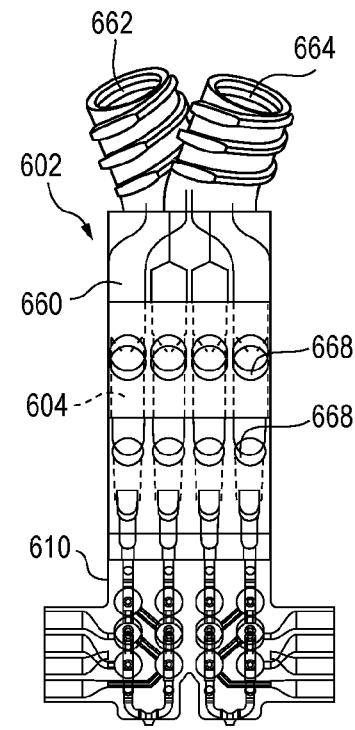

VALVED NOZZLE WITH A COMPENSATOR AND MASSIVELY PARALLEL 3D PRINTING SYSTEM

CROSS REFERENCE TO RELATED APPLICATIONS

This application is a filing under 35 U.S.C. § 371 of International Patent Application PCT/US2017/064738, filed Dec. 5, 2017, and claiming priority to U.S. Provisional Patent Application Serial No. 62/431,223, filed Dec. 7, 2016. All applications listed in this paragraph are hereby incorporated by reference in their entireties.

FEDERALLY SPONSORED RESEARCH OR DEVELOPMENT

This invention was made with government support under DE-SC0001293 awarded by the Department of Energy (DOE). The Government has certain rights in the invention.

TECHNICAL FIELD

The present disclosure is related generally to three-dimensional printing. Specifically, the present disclosure is related to three-dimensional printing nozzles and related methods of use.

BACKGROUND

Three-dimensional ("3D") printing, also known as additive manufacturing, typically includes using a nozzle to deposit successive layers of a material under computer control. It generally encompasses a class of fabrication techniques in which structures are built in a "bottom up" mode. A 3D printer typically prints an object by depositing a material, referred to herein as an "ink," on a substrate layer by layer. Depending on the ink and set-up, a printed object could be a complex, discrete 3D structure (e.g. open foam lattice) that is not a layer-based 3D-printed structure.

3D printing is gaining acceptance as a low-cost production method for custom-designed components. However, 3D printing remains a relatively slow process, partially because by nature a 3D product has to be printed line by line, dot by dot, and layer by layer. To enable high throughput patterning, several techniques have been recently modified to incorporate parallelization schemes. For example, massively parallel variants of dip pen nanolithography, such as polymer pen lithography and hard-tip, soft-spring lithography, use multi-tip arrays composed of silicon or PDMS that deposit a low viscosity ink on a substrate to yield 2D nanoscale patterns. Parallel electrospinning simultaneously deposits nanofibers onto a substrate from independent and separate nozzles. These techniques, however, often require custom-designed and custom-fabricated printing nozzle units, including micronozzles and suitable ink fluid channels. Further, these techniques generally do not allow for precise control of the flow a single ink through a nozzle tip, nor do they provide a nozzle tip with material-switching capabilities.

SUMMARY

In one aspect, the present disclosure provides a nozzle for a 3D printing system. The nozzle may include a flowpath with a material inlet and a material outlet. The nozzle may further include a valve in fluid communication with the flowpath between the material inlet and the material outlet, where the valve includes a closed state and an open state, where in the closed state the valve obstructs the flowpath between the material inlet and the material outlet, and where in the open state the material inlet is in fluid communication with the material outlet. The nozzle may further include a compensator in fluid communication with the flowpath, where the compensator includes a contracted state associated with the open state of the valve and an expanded state associated with the closed state of the valve. In the contracted state, the compensator may provide a portion of the flowpath with a first volume. In the expanded state, the compensator may provide the portion of the flowpath with a second volume, the first volume being greater than the second volume.

The nozzle may include a first control inlet and a second control inlet, where the first control inlet is in fluid communication with a chamber of the compensator, and where the second control inlet is in fluid communication with a chamber of the valve.

The flowpath may be a first flowpath, the valve may be a first valve, and the compensator may be a first compensator. The nozzle may further include a second flowpath including a material inlet and a material outlet, a second valve configured to control the flow of a material through the second flowpath, and a second compensator configured to compensate for volumetric variations of the second flowpath due to an operation of the second valve. The first flowpath and the second flowpath may share an outlet.

The nozzle may include a first control inlet and a second control inlet, where the first control inlet is in fluid communication with the first compensator and the second valve, and where the second control inlet is in fluid communication with the second compensator and the first valve.

The valve may be a microfluidic valve with a displaceable diaphragm. The compensator may include a displaceable membrane.

The nozzle may be configured to perform a 3D printing process through movements in one direction, the one direction being a vertical direction.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 5 shows extrusions of 3D-printed material as they may appear after being extruded from a valved nozzle in accordance with the present disclosure.

FIG. 6 shows 3D printed material as they may appear after being extruded from a valved nozzle with a compensator in accordance with the present disclosure.

FIGS. 7A-C shows a nozzle for 3D printing with two-material switching capabilities in accordance with the present disclosure.

FIGS. 9A-C show a perspective view, a front view, and a side view, respectively, of a massively-parallel 3D printing system in accordance with the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The present disclosure relates to a valved nozzle for a 3D printing system and associated methods. A nozzle suitable for 3D printing may be in the form of a line or extruded filament having an inner diameter of from about 1 micron to about 15 mm in size, and more typically from about 50 microns to about 500 microns. Depending on the injection pressure and the nozzle translation speed, the deposited material may have a diameter ranging from about 1 micron to about 20 mm, and more typically from about 100 microns (0.1 mm) to about 5 mm.

The printing process may involve extruding a filament with one or composite ink formulations. The composite ink formulation(s) fed to the one or more nozzles may be housed in separate syringe barrels that may be individually connected to a nozzle for printing by way of a Luer-Lok™ or other connector. The extrusion may take place under an applied pressure of from about 1 psi to about 200 psi, from about 10 psi to about 80 psi, or from about 20 psi to about 60 psi. The pressure during extrusion may be constant or it may be varied. By using alternative pressure sources, pressures of higher than 100 psi or 200 psi and/or less than 1 psi may be applied during printing. A variable pressure may yield a filament having a diameter that varies along the length of the extruded filament. The extrusion is typically carried out at ambient or room temperature conditions (e.g., from about 18° C. to about 25° C.) for viscoelastic ink formulations.

During the extrusion and deposition of the continuous extruded filament, the nozzle may be moved along a predetermined path with respect to the substrate with a positional accuracy of within ±100 microns, within ±50 microns, within ±10 microns, or within ±1 micron. Accordingly, the filaments may be deposited with a positional accuracy of within ±200 microns, within ±100 microns, within ±50 microns, within ±10 microns, or within ±1 micron. The nozzle may be translated and/or rotated, and the continuous filament may be deposited at translation speeds as high as about 3 m/s (e.g., from about 1 cm/s to about 3 m/s), and more typically in the range of from about 1 mm/s to about 500 mm/s, from about 1 mm/s to about 100 mm/s, or from about 1 mm/s to about 10 mm/s.

Figure 1:
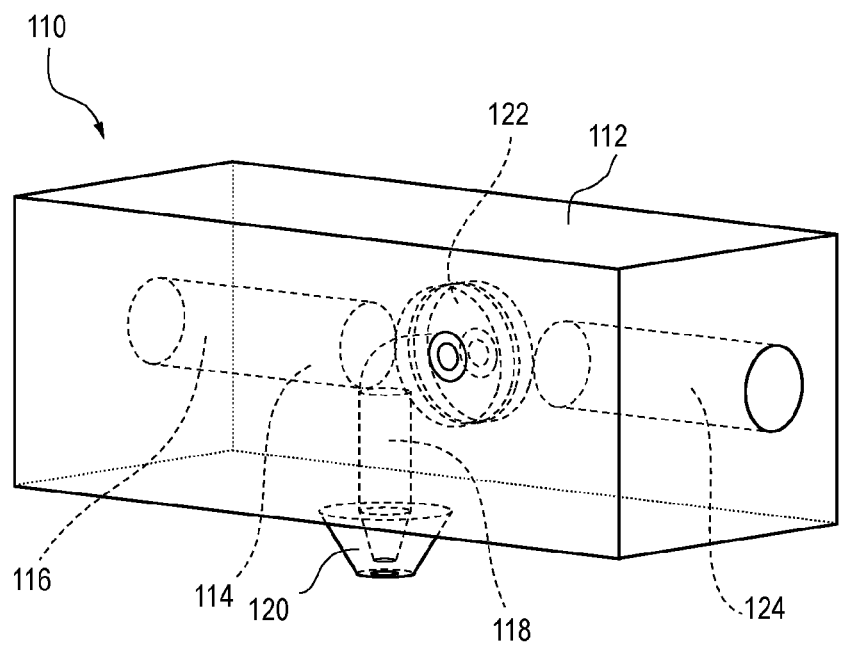
FIG. 1 shows a valved nozzle for 3D printing in accordance with the present disclosure.

FIG. 1 shows a valved nozzle 110 for use in a 3D printing system. The nozzle 110 may include a nozzle body 112 with a flowpath 114 for the flow of an ink composition or other material suitable for use during 3D printing (herein referred to as "the printing material"). The nozzle body 112 may include a material inlet 116 and a material outlet 118 at a nozzle tip 120. The material outlet 118 may have any cross-section shape, which may control the cross-sectional shape of an extruded filament. For example, the cross-sectional shape of the material outlet 118 may be circular, rectangular, or any other suitable shape at the nozzle tip 120. In one exemplary embodiment, the material outlet 118 may have a rectangular cross-section at the nozzle tip 120 to form filaments with rectangular cross-sections, which may be advantageous for limiting space or air located between adjacent filaments. A valve 122 may be located between the material inlet 116 and the material outlet 118 and may be configured to control the flow of the printing material through the flowpath 114. In some embodiments, including the depicted embodiment, the valve 122 may be associated with (e.g., in fluid communication with) a control inlet 124. The control inlet 124 may be configured to provide for the operation of the valve 122, as described in more detail below.

The valve 122 may have an open state where the material inlet 116 is in fluid communication with the material outlet 118. When in a closed state, the valve 122 may at least partially obstruct the flowpath 114 to limit or prevent flow of the printing material to the material outlet 118. Accordingly, control of the flow of extrusion of the printing material during a 3D printing process may be accomplished by controlling the state of the valve 122.

Figure 2A:
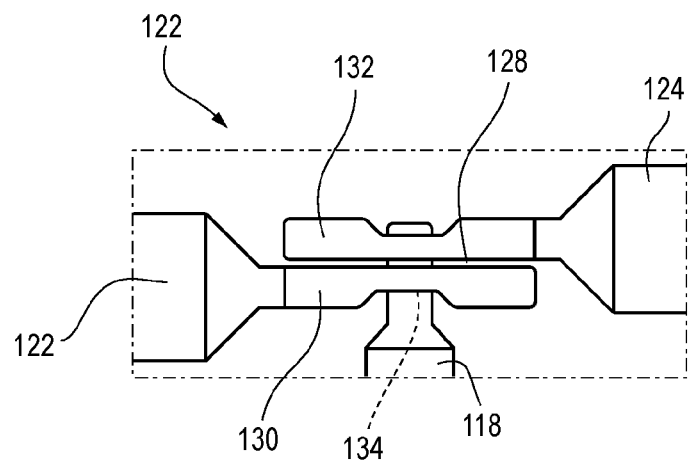
FIG. 2A shows an embodiment of a valve for use in the nozzle of FIG. 1.

FIG. 2A shows one embodiment of the valve 122 for use in the nozzle 110 of FIG. 1. The valve 122 may be any suitable valve, such as an electronically or hydraulically actuated valve. In one embodiment, and referring to FIG. 2A, for example, the valve 122 may be a microfluidic valve similar or identical to as described in the following publication, which is herein incorporated by reference in its entirety: Au, Anthony K. et al. "3D-Printed Microfluidic Automation." Lab on a chip 15.8 (2015): 1934-1941. PMC. Web. 26 Aug. 2016. The valve 122 may be formed by a 3D printing process such as by stereolithography in some embodiments, and it may be formed integrally with the nozzle body 112 (of FIG. 1). In some embodiments, the entirety of the nozzle body 112 (including the valve 122)

may be formed of the same material (such as an acrylic photopolymer in one exemplary embodiment), though it is also contemplated that multiple materials may be used. For example, it may be advantageous to form the valve 122 with a material that is different than a material of another location of the nozzle body 112 to locally optimize the characteristics of the nozzle body 112.

The valve 122 is depicted in an open state in FIG. 2A. As shown, the material inlet 116 is in fluid communication with the material outlet 118 through the flowpath, and in particular through a flow chamber depicted as the first chamber 130 of the valve 122. A diaphragm 128 of the valve 122, which may include a displaceable membrane, may separate the first chamber 130 from a control chamber depicted as the second chamber 132. The second chamber 132 may be in fluid communication with the control inlet 124. When the valve 122 is in the open state, the pressure in the first chamber 130 may be greater than or approximately equal to the pressure in the second chamber 132 such that the diaphragm is not displaced towards the material outlet 118 and does not obstruct flow into the material outlet 118. It is also contemplated that the open state could be achieved even when the pressure in the second chamber 132 is greater than the pressure in the first chamber 130 but where the pressure differential is not great enough to displace the diaphragm 128 to an extent such that it substantially obstructs flow.

Figure 2B:
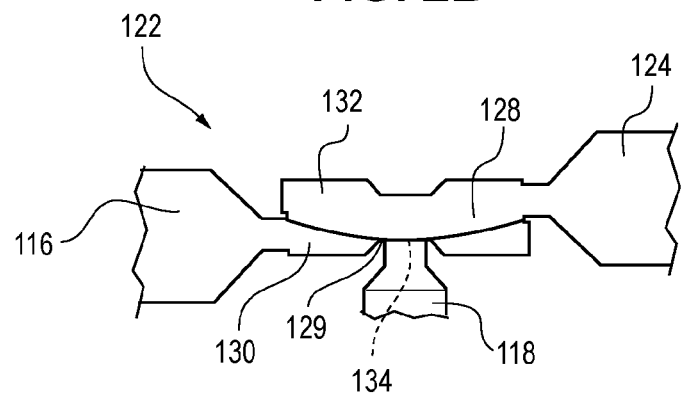
FIG. 2B shows the valve of FIG. 2A in a closed state.

Referring to FIG. 2B, to close the valve 122, a control pressure may be provided to the second chamber 132 through the control inlet 124. The control pressure may be a pressure greater than the pressure within the first chamber 130. The pressure differential between the second chamber 132 and the first chamber 130 may cause the diaphragm 128 to displace towards the material outlet 118. Accordingly, the displacement of the diaphragm 128 may at least partially obstruct the flow through the first chamber 130, and if the above-described pressure differential is great enough, the diaphragm 128 may form a seal at an entrance 134 (and particularly at the depicted valve seat 129 such that flow to the material outlet 118 is substantially blocked.

Figure 3:
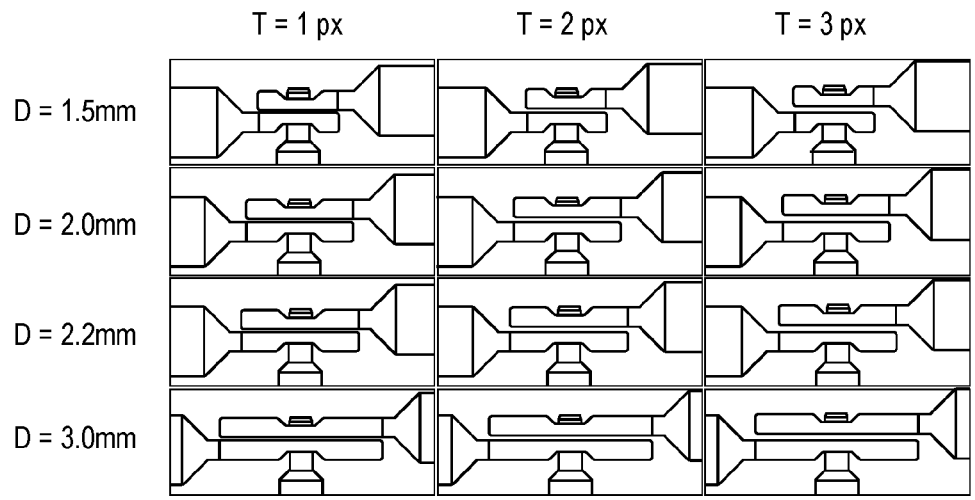
FIG. 3 shows nine (9) embodiments of microfluidic valves for use in a 3D printing nozzle.

FIG. 3 shows nine (9) embodiments of microfluidic valves for potential use in a 3D printing nozzle. As shown, the size of the microfluidic valve described herein may be relatively small when compared to valves commonly used in 3D printing processes. For example, in a non-limiting exemplary embodiment, a diaphragm of a suitable valve may have a membrane with a thickness from about 40 μm to about 130 μm, and the diameter of the membrane may be from about 1.5 mm to about 3.0 mm. Other suitable sizes may be used. Utilizing a valve with small dimensions may be advantageous for limiting the volume of the flow chamber (i.e., the first chamber 130 of FIG. 2A), thereby limiting the additional amount of material extruded from the nozzle as an effect of closing the valve. To illustrate, referring to FIG. 2B, when the diaphragm 128 moves towards the material outlet 118 to close the valve 122, at least some of the material in the first chamber 130 may be forced by the diaphragm 128 out of the first chamber 130 and towards or into the material outlet 118. This may cause an additional amount of material to be forced out of the nozzle (as shown by FIG. 5 below). To limit or overcome this effect, it may be desirable to include a compensator that can adjust a volume within the flowpath in response to the operation of the valve.

Figure 4:
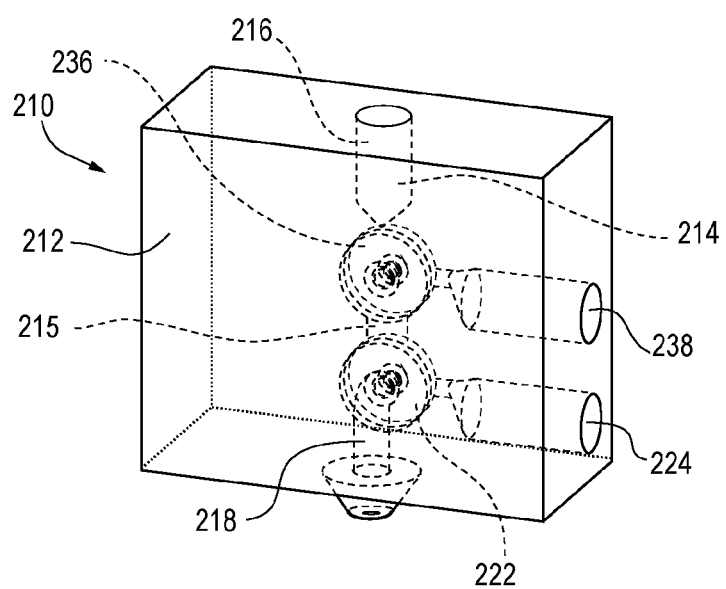
FIG. 4 shows a valved nozzle with a compensator in accordance with the present disclosure.

FIG. 4 shows a nozzle 210 with a nozzle body 212, a valve 222, and a compensator 236. Like the valve 222, the compensator 236 can be formed integrally with the nozzle body 212 and may include the same material as the remainder of the nozzle body 212 (such as an acrylic photopolymer). In other embodiments, the valve 222 and/or the compensator 236 may include multiple materials (and/or may be formed of a material different than another material of the nozzle body 212) to locally optimize their characteristics. The valve 222 and/or the compensator 236 may be located along a flowpath 214 between a material inlet 216 and a material outlet 218 to control the fluid communication between the material inlet 216 and the material outlet 218. The operation of the compensator 236 is described in detail with reference to FIGS. 4A-C.

Figure 4A:
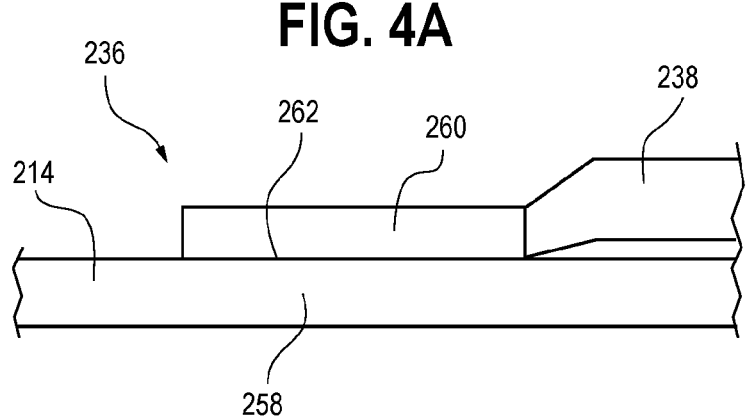
FIG. 4A shows a side view of an embodiment of a compensator for use in the nozzle of FIG. 4, where the compensator is in an expanded state.
Figure 4B:
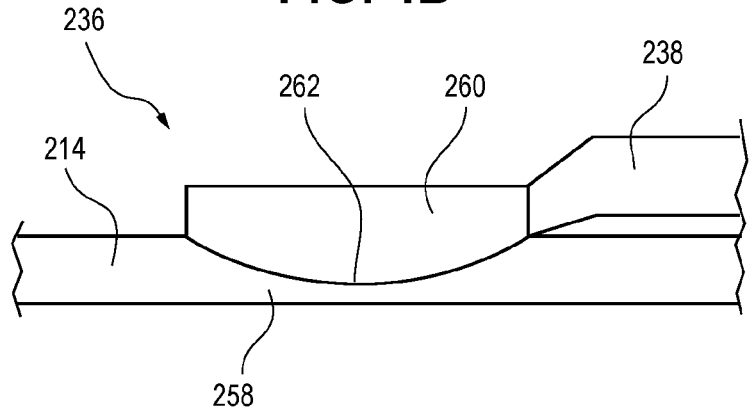
FIG. 4B shows a side view of the compensator of FIG. 4A in a contracted state.

Referring to FIG. 4A, which shows a side view of the compensator 236 in an expanded state (meaning a region within the flowpath 214 of the valve has an expanded volume with respect to a contracted state), the compensator 236 may include two chambers: a flow chamber 258 forming a portion of the flowpath 214, and a control chamber 260 located opposite a diaphragm 262 (which may include a displaceable membrane). The compensator 236 is preferably in the expanded state of FIG. 4A when a pressure less than a control pressure is applied to the control chamber 260 through the compensator control inlet 238. When a control pressure is applied to the control chamber 260 (e.g., through the compensator control inlet 238), the compensator 236 may adjusted into the contracted state depicted by FIG. 4B. As shown, the diaphragm 262 may move such that the volume of a portion of the flowpath 214 is reduced (e.g., the portion of the first chamber 258) in the contracted state of FIG. 4B with respect to the expanded state of FIG. 4A. When the control pressure is removed from the control chamber of the compensator 236 (such that the pressure in the control chamber is reduced), the compensator 236 may move back to the expanded state of FIG. 4A where the diaphragm 262 is displaced towards the control chamber such that a region of the flowpath 214 is expanded in volume.

Figure 4C:
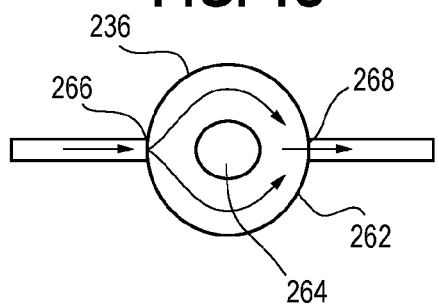
FIG. 4C shows a top view of the compensator of FIG. 4A and FIG. 4B in the contracted state.

Preferably, when a control pressure is applied to the compensator 236, the compensator 236 may be configured such that it does not substantially obstruct the flowpath 214 but rather continues to allow flow through its flow chamber. While not shown in FIG. 4B, it is contemplated that the diaphragm 262 of the compensator 236 may be displaced to an extent where it contacts an opposite wall of the flowpath 214. However, as shown in the top view of the circular compensator 236 of FIG. 4C, a path may still exist such that the material is capable of flowing around the contact portion 264 of the diaphragm 262 from an inlet 266 of the compensator 236 to an outlet 268 of the compensator 236. Similarly, while not shown in FIG. 4B, the compensator 236 may include a valve seat located the opposite wall of the flowpath 214, and may be configured to contact the valve seat when the control pressure is applied. The valve seat may be configured to limit the movement of the diaphragm 262 of the compensator 236 to prevent over-compensation. However, again as illustrated by FIG. 4C, a flow path may still exist such that material is capable of flowing around the valve seat and the compensator 236.

Referring back to FIG. 4, during operation of the nozzle 210, the compensator 236 may generally be in the above-described contracted state when the valve 222 is open. Material may flow from the material inlet 216, through the flow chamber of the compensator 236, through the flow chamber of the valve 222, and to the material outlet 218. The compensator may remain in the contracted state due to a control pressure applied through the compensator control inlet 238. A neutral pressure (e.g., a pressure less than the control pressure) may be applied to the valve control inlet 224 such that the valve 222 remains open.

When a 3D printing system calls to stop the flow of material through the valve 222, a control pressure may be applied through the valve control inlet 224 to close the valve 222. Simultaneously or shortly before/thereafter, the control pressure within the compensator control inlet 238 may be released such that the compensator 236 moves from the contracted state to the expanded state.

Accordingly, as the valve 222 closes (thereby decreasing the volume of the flowpath 214 at the valve 222), the compensator may simultaneously (or with some delay) move to the expanded state, thereby increasing the volume of a portion of the flowpath 214 at the compensator 236. This increase in volume provided by the compensator 236 may be approximately equal to the decrease in volume provided by the valve 222 when moving from an open state to the closed state. In exemplary embodiments, the portion of the flowpath 214 (depicted as the connection 215) connecting the compensator 236 to the valve 222 is configured to provide relatively low flow resistance (for example, by having a relatively large cross-sectional area for minimizing pressure drop). Accordingly, when the compensator 236 is located upstream with respect to the valve 222, the shift of the compensator 236 from the contracted state to the expanded state may create a vacuum effect, thereby suctioning at least some material upstream as the valve 222 closes. It is also contemplated that the compensator 236 could be located downstream with respect to the valve 222 or adjacent to the valve 222 within the flowpath 214. Advantageously, the operation of the compensator 236 in conjunction with the operation of the valve 222 may decrease unintentional and/or undesirable extrusion of additional materials from the nozzle 210 caused by valve operation.

A separate pressure control device (herein referred to as an "actuator") may control the pressure in each of the control inlets 224, 238. The actuator may be a pneumatic actuator, such as an MC V114 pneumatic solenoid valve marketed by SMC Pneumatics® of Yorba Linda, Calif. In some embodiments, a single actuator (not shown) may provide the control pressure to the valve control inlet 224 and/or the compensator control inlet 238. It is contemplated that the single actuator may be a device capable of switching the control pressure between the two inlets such that, in all operational circumstances, one of the valve control inlet 224 and the compensator control inlet 238 is subjected to the control pressure while the other is not. It is also contemplated that the structures of the compensator 236 and the valve 222 may call for different control pressures (i.e., the control pressure required to operate the compensator 236 may be higher than the control pressure required to operate the valve 222, or vice versa). Further, it is contemplated that in some situations, the compensator 236 may act as a valve and/or the valve 222 may act as a compensator, particularly when the structures of the valve 222 and the compensator 236 are similar. Like the valve 222, the compensator 236 may be formed integrally with the nozzle body 212, for example through a stereolithography process.

FIG. 5 shows several extrusions 342 of printed material as they may appear after they are placed onto a substrate 340 from a nozzle without a compensator (such as nozzle 110 of FIG. 1). Each of the extrusions is depicted with a first end 344 and a second end 346. The first end 344 corresponds with the beginning of a period of extrusion (e.g., the opening of the valve 122 of FIG. 1), and the second end 346 corresponds with the end of a period of extrusion (e.g., the closing of the valve 122 of FIG. 1). A line 348 represents the nozzle position on the substrate during the time that the valve is open. As shown, the second end 346 may include more extruded material than the first end 344. This may be the result of the volumetric change within the flowpath of the nozzle due to the operation of a microfluidic valve. Further, a delay may occur between the time the valve is open to time when material begins extruding (represented by the distance between the beginning of the line 348 and the first end 344). This delay may be due expansion of valve's flow chamber within the flowpath of the nozzle when the valve opens, thereby requiring the chamber to be filled prior to forcing printing material out of the valve outlet.

When a more consistent extrusion is desired, it is contemplated that the speed of the nozzle may be varied such that the quantity of extruded material at each relative position of the extrusions 342 is relatively consistent. However, varying the speed of the nozzle each time the 3D printing system calls for an adjustment in material flow may require a relatively complex mechanical and computational system for operating the nozzle. Further, when more than one nozzle is operated at once (as described in more detail below), the change in speed of one nozzle may affect the speed of other nozzles. Including a compensator may overcome these challenges.

FIG. 6 shows several extrusions 442 of material as they may appear after extrusion onto a substrate 440 from the nozzle with a compensator (such as the nozzle 210 of FIG. 4). Each of the extrusions is depicted with a first end 444 and a second end 446. The first end 444 corresponds with the beginning of a period of extrusion (e.g., the opening of the valve 222 of FIG. 4), and the second end corresponds with the end of a period of extrusion (e.g., the closing of the valve 222 of FIG. 4). When compared with the extrusions 342 depicted by FIG. 5, above, the extrusions 442 may have a relatively consistent amount of material at each longitudinal cross-section. In other words, the first end 344 and the second end 346 of the extrusions 342 may have a relatively similar quantity of extruded material. Further, since the compensator decreases a volume of a portion of a flowpath when moving from the compensated state to the contracted state (for example, when the valve opens), compensator may offset at least a portion of the delay described above with reference to FIG. 5.

FIG. 7A, 7B, and 7C respectively show perspective, front, and side views of a nozzle 510 having a nozzle body 512 with a first material inlet 516a and a second material inlet 516b. In an exemplary 3D printing process utilizing the nozzle 510, a first material may be associated with the first material inlet 516a and a second material may be associated with the second material inlet 516b. The first material and the second material may have different functional or aesthetic characteristics. For example, the first material may have a first color and the second material may have a second color. In some embodiments, one material may be a placeholder material that is melted away or otherwise removed from 3D-printed object after the 3D printed process, while the other material may be a material that is configured to form the final structure of the 3D-printed object. Further, it is contemplated that one material may be a conductive material and the other may be an electrically-insulative material such that they combine to form a 3D-printed object with a conductive component (e.g., a device for use in electronics). The examples above are provided for illustrative purposes only, and one skilled in the art will recognize many other applications for multi-material nozzles in 3D printing.

Referring to FIG. 7A, 7B, and 7C, a first valve 522a and a first compensator 536a may be associated with the first flowpath 512a. Similarly, a second valve 522b and a second compensator 536b may be associated with the second flowpath 514b. The first compensator 536a and the second compensator 536b may respectively compensate for the volumetric variations resulting from the operation of the first valve 522a and the second valve 522b, as described in detail above with respect to FIG. 4.

In the depicted embodiment with two flowpaths, a first control inlet 550 may be associated with (e.g., in fluid communication with) the first compensator 536a and the second valve 522b. Similarly, the second control inlet 552 may be associated with (e.g., in fluid communication with) the second compensator 536b and the first valve 522a. This embodiment advantageously provides the nozzle 510 with the ability to switch between extruding the first material and the second material by simply switching the control pressure between the first control inlet 550 and the second control inlet 552 to operate all four of the first valve 522a, the first compensator 536a, the second valve 522b, and the second compensator 536b during the switch.

To illustrate, in a first-material 3D-printing process associated with the first flowpath 514a, a control pressure (or high pressure) may be provided to the first control inlet 550, and a neutral pressure may be provided to the second control inlet 552. The first compensator 536a, which is associated with the first control inlet 550, therefore will be subjected to the control pressure such that it is in a contracted state. The first valve 522a, on the other hand, will be associated with the low pressure of the second control inlet 552 such that it is in an open or non-actuated state. Accordingly, material entering the first material inlet 516a may flow through the first flowpath 514a and exit the nozzle 510 at a nozzle tip 520.

Referring to the second flowpath 514b, the second compensator 536b will be subjected to the low pressure of the second control inlet 552 such that it is in an expanded state, and the second valve 522b will be subjected to the control pressure (high pressure) of the first control inlet 550 such that it is in a closed or actuated state. Accordingly, the material associated with the second flowpath 514b may be substantially prevented from flowing through the second flowpath 514b and to the nozzle tip 520.

When it is desired to switch extrusion from the first material to the second material, the first control inlet 550 can be switched from the control pressure to low pressure, and the second control inlet 552 can be switched from low pressure to the control pressure. Further, it is contemplated that both control inlets could be subjected to the control pressure such that neither material is extruded, and/or both control inlets could be associated with low pressure such that the extrusion out of the nozzle tip 520 is a mixture or other combination of the first material and the second material.

An embodiment with two flowpaths 514a, 514b is particularly advantageous since it can be fully controlled with only two control inlets 550, 552. Other embodiments may require more control inlets than flowpaths (for example, an embodiment incorporating four (4) flowpaths for four materials may require eight (8) control inlets since a particular compensator is not directly dependent on the operation of an opposite valve). The control inlets 550, 552 each may have two branches. For example, the first control inlet 550 has a first branch 550a extending to the first compensator 526a and a second branch 550b extending to the second valve 522b. The second control inlet 552 includes a first branch 552a extending to the second compensator 538b and a second branch 552b extending to the first valve 522a. It is contemplated that a single actuator (not shown) may provide the control pressure to both of the control inlets 550, 552. For example, the single actuator may be capable of switching the control pressure from one control inlet to the other, thereby choosing which material is extruded at any given time.

Figure 8A:
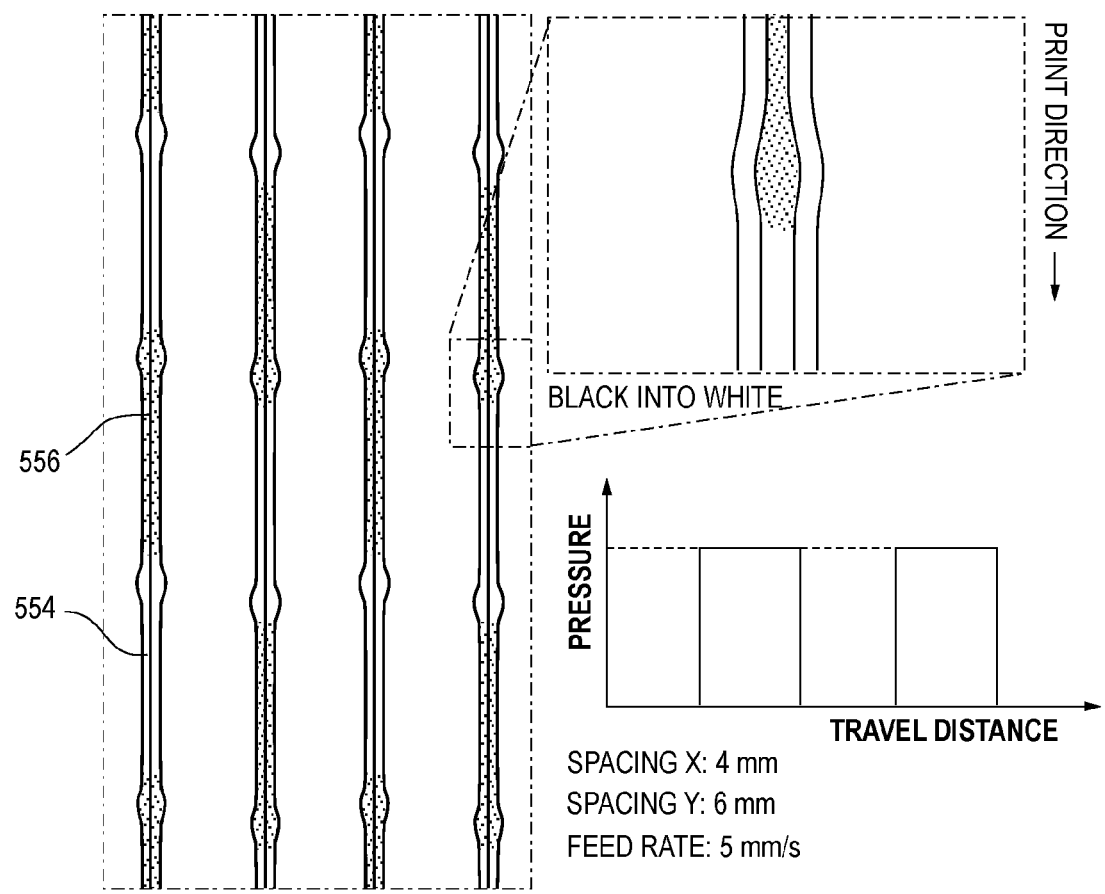
FIG. 8A shows first and second materials 3D printed on a substrate in accordance with the present disclosure.
Figure 8B:
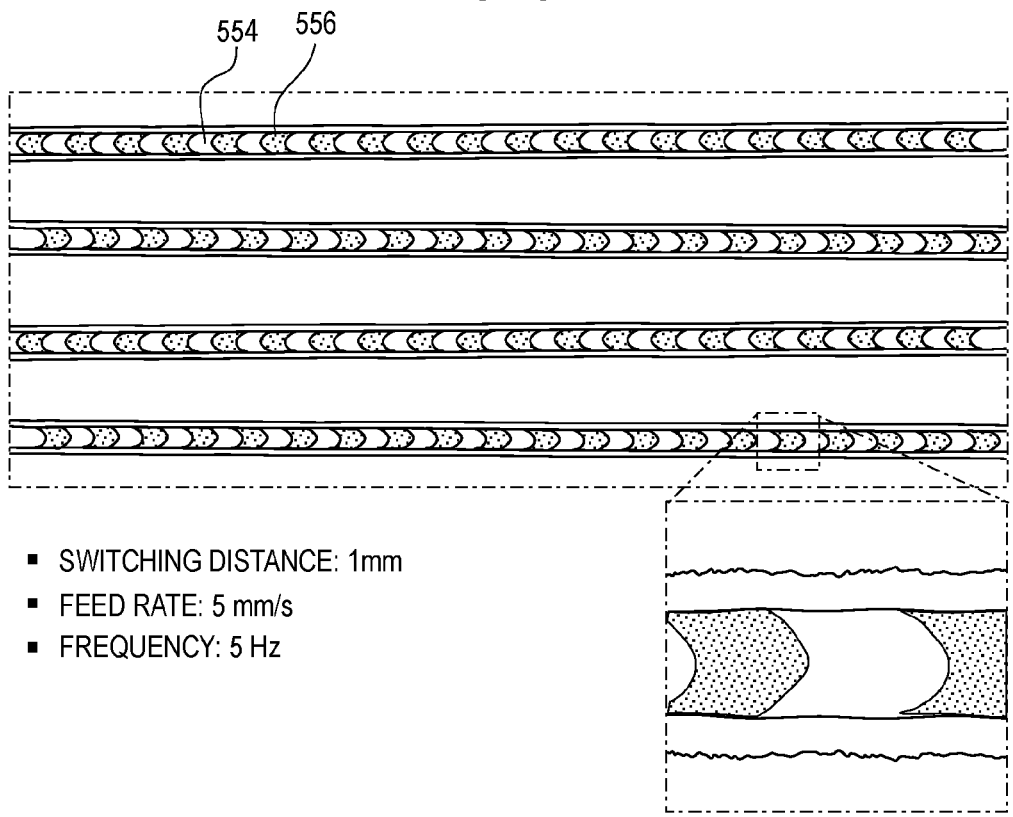
FIG. 8B shows first and second materials 3D printed on a substrate at a high frequency in accordance with the present disclosure.

FIG. 8A shows an example of the extrusion of a first printing material 554 and a second printing material 556 out of a nozzle with material-switching capabilities, such as the nozzle 510 described above with reference to FIG. 7A. As shown, the extrusion of the first printing material 554 and the second printing material 556 may have a relatively consistent amount of material at each longitudinal cross-section when compared to a nozzle without a compensator (see FIG. 5). Further, a nozzle such as nozzle 510 of FIG. 7A may provide the ability to switch back and forth between materials at a relatively high frequency while still forming a desirable extrusion with discrete and identifiable sections of each material type. For example, referring to FIG. 8B, the first printing material 554 and the second printing material 556 are clearly identifiable when the nozzle moves at a feed rate of 5 mm/s and the frequency of material switching is 5 Hz (for a switching distance of 1 mm).

FIG. 9A, FIG. 9B, and FIG. 9C respectively show a perspective view, a front view, and a side view of a massively parallel 3D printing system 602. The system 602 may include sixty four (64) two-material switching nozzles similar to the nozzle of FIG. 7A. The nozzles of the system 602 may each be operated independently. Advantageously, since each two-material switching nozzle can be operated with only two (2) control inlets, a relatively low total of one-hundred twenty eight (128) control inlets 650 (each with an associated actuator) may provide complete control of the system 602. The system 602 may be translatable in three dimensions, and may distribute material through many of the individually-controlled nozzles feeding in a parallel direction simultaneously. Advantageously, when forming a complex multi-material 3D printed component, the system 602 with many parallel and individually-controlled nozzles may facilitate the 3D printing of complex and/or large component while substantially decreasing the time and effort required with respect to other printing systems. It is contemplated that the increased speed and efficiency may allow for the printing of components that are not achievable on slower and less-efficient systems. For example, when a component incorporating living tissue (for example as described in U.S. patent application Ser. No. 15/146,613, which is herein incorporated by reference in its entirety), the living tissue may have the ability to survive on a substrate for a certain period of time that may be less than the time required for other systems to complete the printing process, but more than the time required when using the massively parallel system in accordance with this description.

Figure 10:
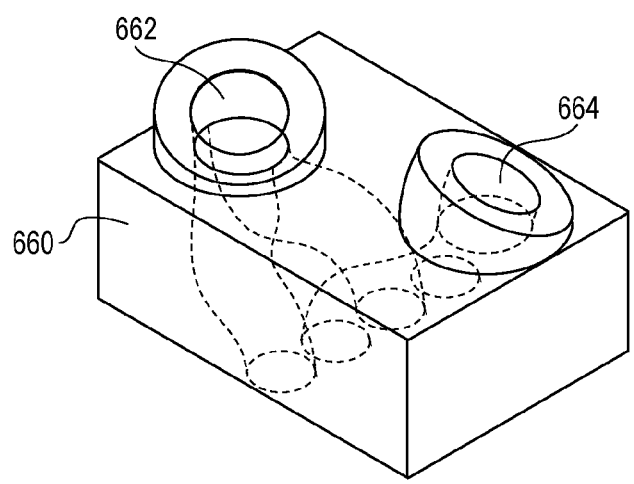
FIG. 10 shows a bifurcated, out-of-plane module used in the 3D printing system of FIGS. 9A-C.

The system 602 may include a modular manifold system 604 for directing the materials to the downstream nozzles. For example, as best shown by FIGS. 9A-C and FIG. 10A, a bifurcated, out-of-plane module 660 may include two material inlets 662, 664 corresponding to two material types. The material inlets 662, 664 may include a device configured to attach to another system (e.g., a material control system incorporating a pump). In at least one exemplary embodiment, the material inlets 662, 664 may include male Luer-Lok™ devices (see FIG. 9A) for easy attachment to a material control system, for example. Each of the material inlets 662, 664 may include a bifurcated manifold for bifurcating the printing material as it flows downstream, as shown. For example, as in FIG. 10, the first material inlet 662 may separate into two branches such that the associated material feeds two ways. Similarly, the second material inlet 664 may separate into two branches such that its associated material feeds in two ways. The manifolds of the module 660 may be designed such that the outlets are out-of-plane (with respect to the set of planes parallel to the front face of the module 660), which is best shown in FIG. 10 and FIG. 9C. These outlets may correspond with out-of-plane material inlets of at least one downstream nozzle module, as described in more detail below.

Figure 11:
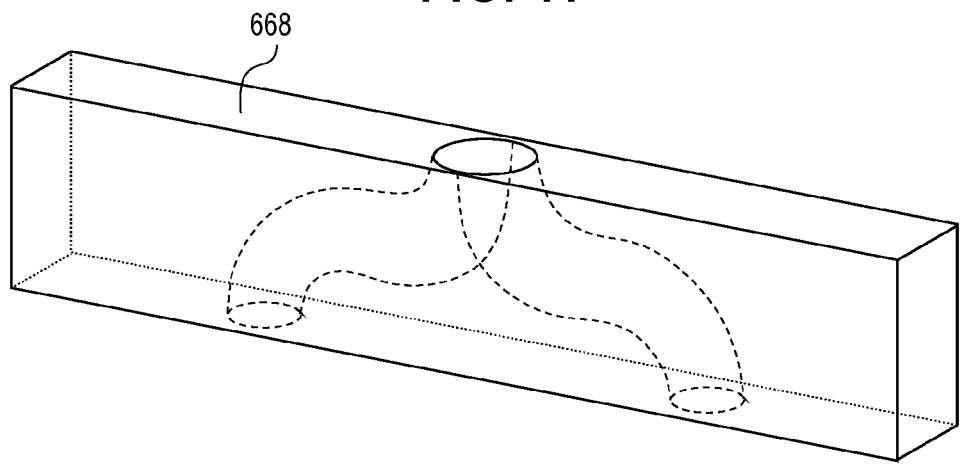
FIG. 11 shows an in-plane module used in the 3D printing system of FIGS. 9A-C.

A second module 668 as shown in FIG. 11 (and also shown by FIGS. 9A-C) may be located downstream of the first module 660. The in-plane second module 668 may handle only one material, and may separate that one material such that it is fed to two different downstream modules and/or two downstream nozzles. Referring to FIG. 9A, there may be several levels of in-plane modules 668 in the system 602 such that only two material inlets (i.e., one for each type of printing material) may provide access to all of the system 602's nozzles. Each relatively-downstream in-plane module 668 may be decreased in size.

Figure 12A:
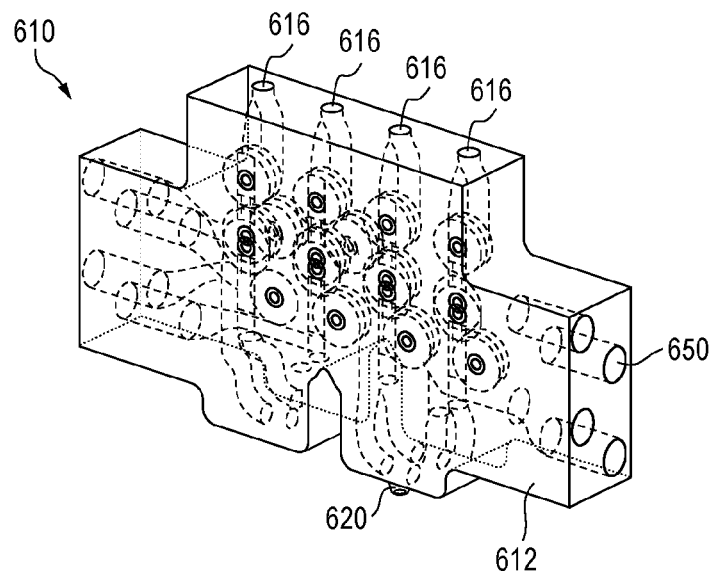
FIG. 12A shows a two-way valve module in accordance with the present disclosure.
Figure 12B:
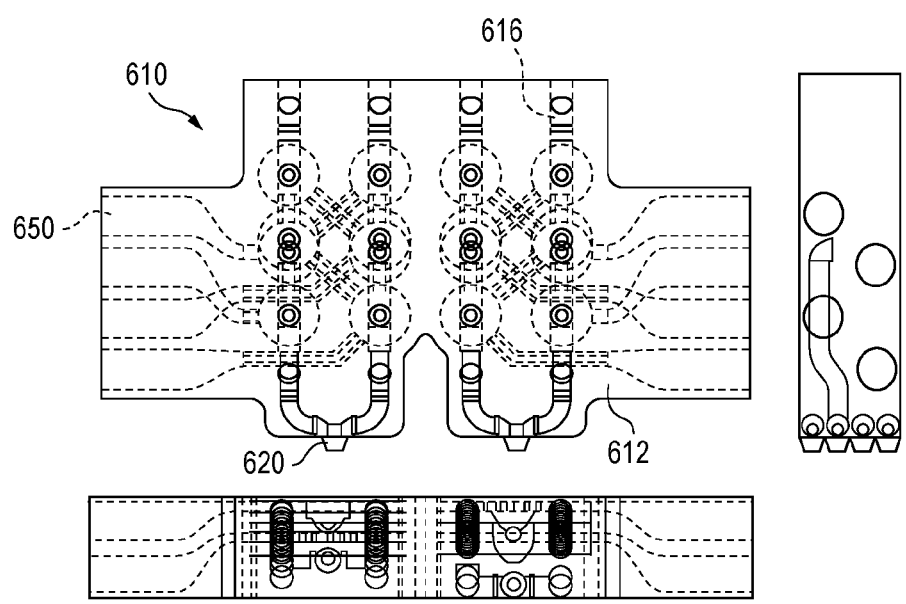
FIG. 12B shows front, side, and bottom views of the nozzle module of FIG. 12A.

Referring to FIG. 12A (and also shown in FIG. 9A-C), a nozzle module 610 is depicted as having a single body 612 incorporating four (4) multi-material nozzles, each nozzle having a nozzle tip 620. The nozzle module 610 incorporates eight (8) control inlets 650 such that each of the four (4) nozzles may be an independently-controllable two-material switching nozzles similar to the nozzle of FIG. 7A. Each of the inlets 650 in the depicted embodiment is associated with one compensator and one valve. The nozzle module 610 includes four material inlets 616, where the material inlets 616 branch into two out-of-plane (with respect to the front surface of the module 610) inlets such that each of the four nozzles includes an inlet for both printing materials (i.e., each nozzle incorporates two material inlets). The inlets for each specific valve may be in-plane with respect to a front surface of the nozzle module 610, and multiple nozzles (e.g., two as shown) may be out-of-plane and stacked with reference to the front-to-back direction. Two of the nozzle tips 620 of the nozzle module 610 are located out of plane with the remaining two nozzle tips 620 with respect to the feeding direction of the nozzle module 620. In other words, referring to the direction of feeding of the nozzle module 610 during a 3D printing process, two of the nozzle tips 620 will trail the other two nozzle tips in the depicted embodiment. In an exemplary embodiment, the trailing nozzle tips 620 may be offset with respect to the leading nozzle tips 620. This may be advantageous for allowing the trailing nozzle tips 620 to fill gaps left between filaments extruded from the leading nozzle tips 620 due to space between the leading nozzle tips 620. Further, and advantageously, including multiple nozzles in a single body 612 may provide for efficient manufacturing and assembly of the 3D printing system. It is contemplated that if a valve and/or a compensator (or another component) of the nozzle module 610 malfunctions or nears the end of its useful life, the entire nozzle module 610.

The modules of a modular 3D printing system may be standardized such that they can be assembled in a variety of ways suitable for particular 3D printing processes. Further, the modules may be disassembled or individually replaced for maintenance or replacement purposes. Each of the modules may be formed by a 3D printing or other additive manufacturing procedure, such as a stereolithography procedure, though any other suitable manufacturing process may also be used. The modules may include elements configured to interlock when properly assembled such that no separate attachment mechanisms, such as screws, adhesives, clamps, etc. are required.

Figure 13:
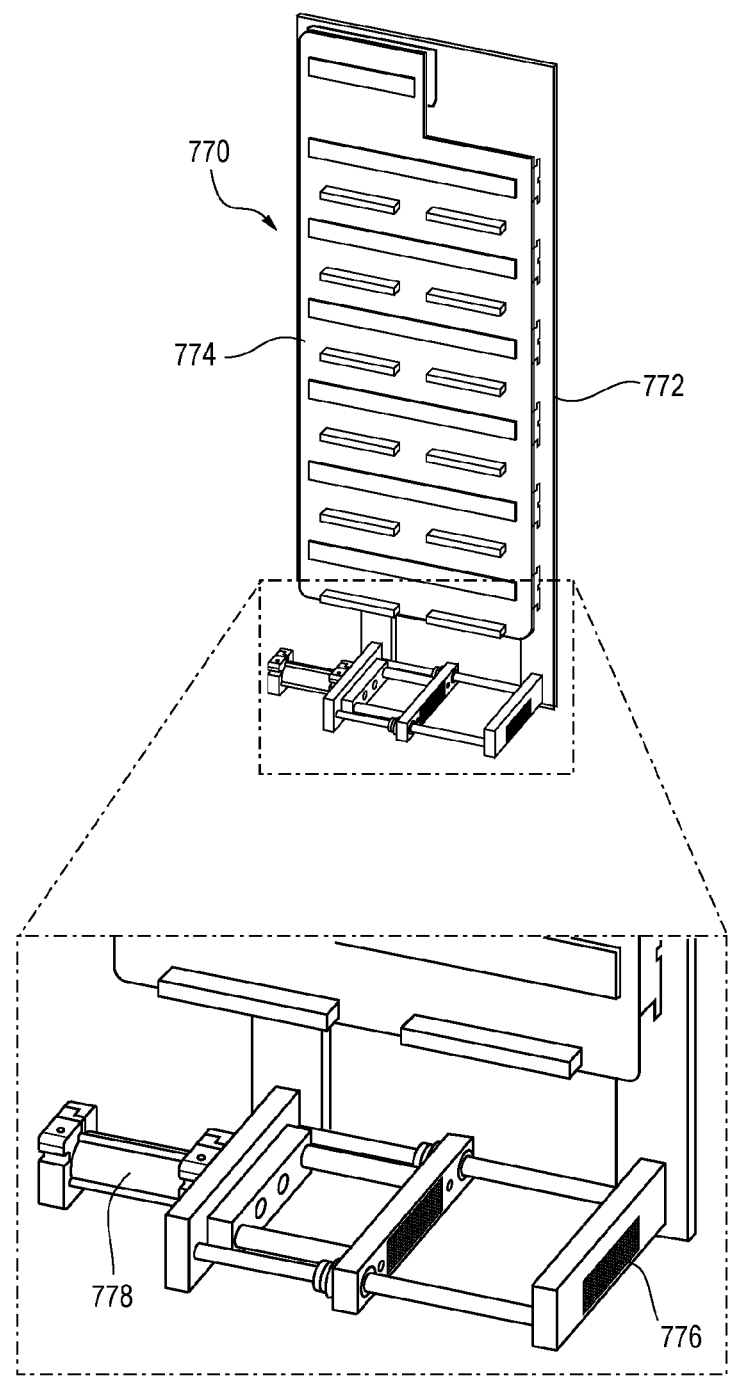
FIG. 13 shows an actuator assembly for use with the massively-parallel 3D printing system of FIG. 9A.
Figure 13A:
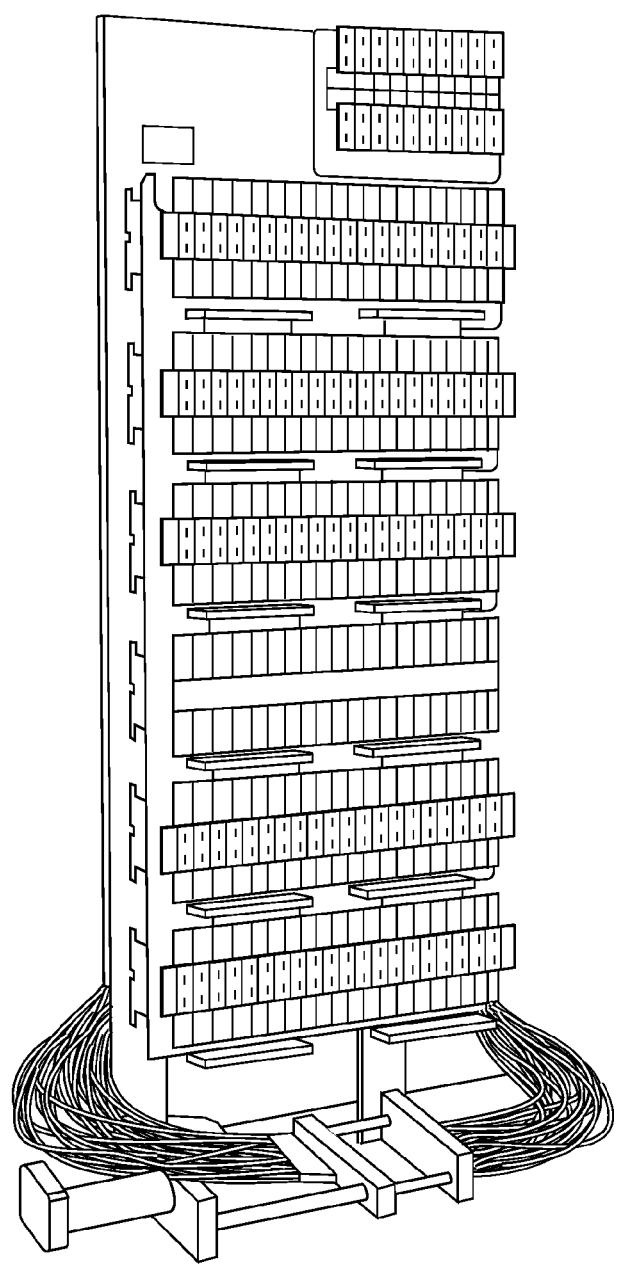
FIG. 13A shows a photograph of a partially-assembled actuator assembly for use with the massively-parallel 3D printing system of FIG. 9A.

FIG. 13 shows an actuator assembly 770 for use with the massively-parallel 3D printing system 602 of FIG. 9A (and FIG. 13A shows a photograph of a partially-assembled actuator assembly similar to that of FIG. 13). Referring to FIG. 13, the actuator assembly may include a frame 772 configured to secure a plurality of actuators 774. The plurality of actuators 774 may include a solenoid valve array, for example. In one embodiment, the actuators 774 are SMC V114 pneumatic solenoid valves marketed by SMC Pneumatics® of Yorba Linda, CA. Each solenoid valve may be associated with at least one control inlet of a nozzle to control a nozzle valve and/or compensator. While not shown in FIG. 13, the actuators 774 may be connected via tubing having control pins at their downstream ends, where the control pins may fit within the plurality of openings 776, each of which may be associated with a nozzle control inlet. A piston 778 may operate in a push-to-connect manner to connect the actuators 774 to the nozzle control inlets via the tubing. While herein, the nozzles are described as relying on the external actuators 774 for control, it is contemplated that the nozzles may be designed such that they are fully electrically actuated using, for example, piezo or liquid crystal actuator elements integrated into the body of the nozzle.

In some embodiments, the entirety of the assembly 770 may be translatable on an x, y, and/or z axes. It is contemplated that the assembly 770 may additionally or alternatively be rotatable about the x, y, and/or the z axes. Advantageously, translation and/or rotation of the entirety of the assembly 770 with the nozzles during a 3D printing process will limit the undesirable and potentially dangerous movement of the pneumatic tubing while under pressure. The assembly 770, and particularly the actuators 774, may be electrically connected to a controller located at a stationary location wirelessly or through a series of electric wires. The controller may be a computer or another device, and it may control both the operation of the actuators 774 and the positioning of the assembly 774 during a 3D printing process.

While the embodiments described above are generally described performing 3D printing by forming successive layers on a substrate (through multiple passes over the substrate, for example), nozzles or printheads for other suitable 3D printing processes may be used. For example, referring to FIG. 14, a nozzle (referred to as a printhead 880) may have a plurality of outlets 882 (shown in FIG. 14B) arranged such that the printhead 880 may form a printed part 884 through movement in one direction, such as the vertical direction along the z-axis. In the depicted embodiment, the printhead 880 includes one-thousand twenty-four (1024) outlets 882 arranged in a 32×32 rectangular grid in the x-y plane, but other suitable arrangements may also be used. During operation and while moving vertically, ink may be extruded from the outlets 882 of the printhead 880. The outlets 882 may be slightly over-pumped to fill any potential gaps corresponding to the walls between the outlets 882. The resolution of a printed part 884 may be determined by the size of the outlets 882, and size of the printed part 884 may be determined by the cross-sectional area of the printhead 880. Since the printhead 880 only requires movement in one direction (rather than two or more directions), the print speed may be increased drastically. It may also be possible to print multiple passes next to each other to increase the part size beyond that of the dimensions of the printhead 880.

The multi-material aspect described herein may be used with the printhead 880 which may be advantageous for allowing for the printing of the part 884 using two or more inks or materials, such as one or more permanent materials and a sacrificial support material (which may be removed after the 3D printing process). In some embodiments, the part 884 may be printed during a single vertical motion of the printhead 880 without necessitating layer-by-layer printing. Further, it is contemplated that the part 884 may be encapsulated by a frame 886 during the printing process, which may be advantageous, for example, when printing with inks having a relatively low viscosity, and/or for providing adequate support when the height of the printed part 884 relatively large such that the bottom portion of the part 884 could collapse from the weight of the material above prior to setting. In other embodiments, the encapsulation may occur due to material printed at the outer edge of the part 884 during the 3D printing process. The encapsulation may also be advantageous for embedding a particular material inside a multi-material matrix (for example, to prevent a particular material from oxidizing).

Figure 14:
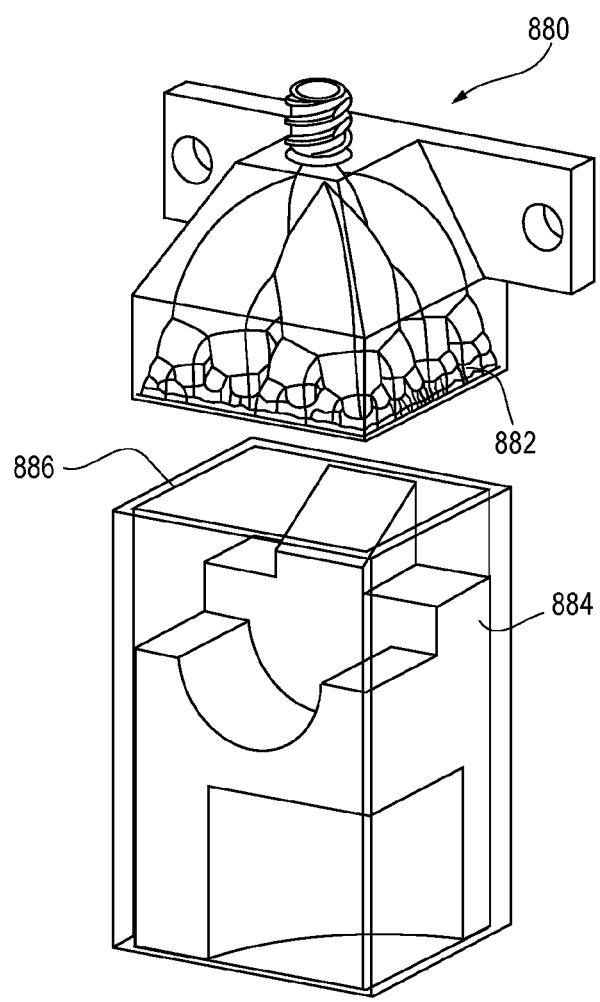
FIG. 14 shows a perspective view of a multi-material printhead capable of 3D printing a printed part with movement in one direction in accordance with the present disclosure.
Figure 14A:
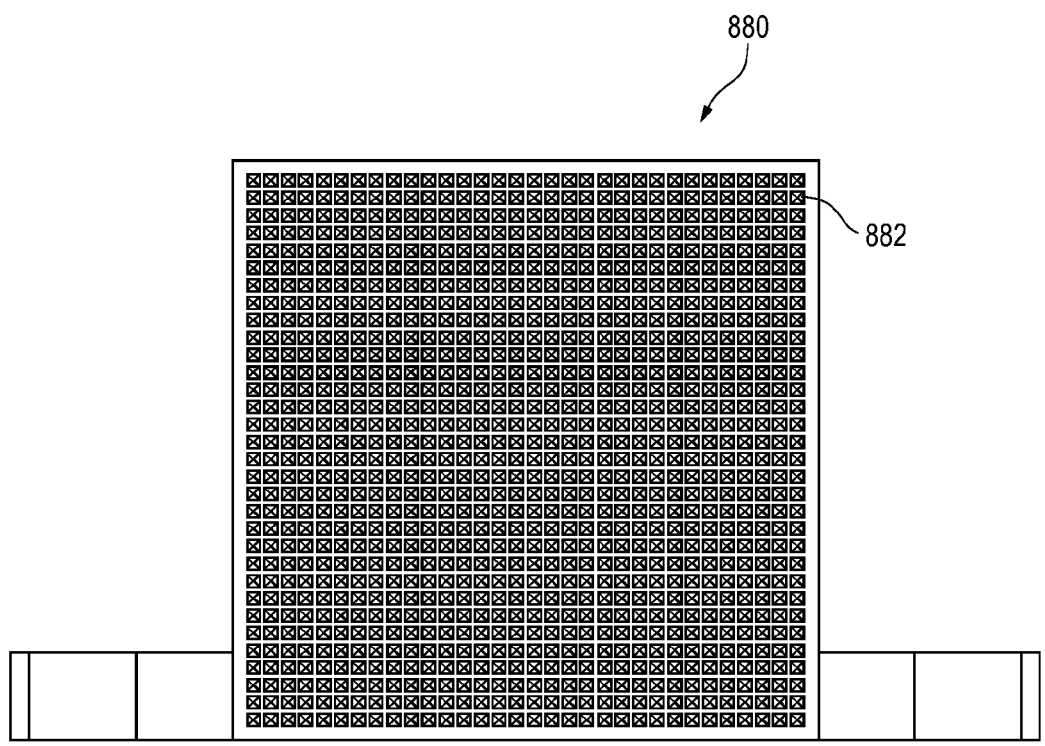
FIG. 14A shows a bottom view of the multi-material printhead of FIG. 14.

The printhead 880 of FIG. 14 is applicable to a range of materials and printing methods, and hence all the options described above with respect to the valved and/or compensated nozzles may apply. When the printhead 880 is a multi-material printhead, it may include a quad-furcation manifold network (i.e. a bi-furcation manifold network in two directions, as shown) to channel two or more types of ink to each of the outlets 882. Other suitable channel networks may be used. Optionally, each outlet 882 may be individually controlled, for example through a pneumatic or electronic, piezo-based system, and each outlet 882 may be associated with a valve and/or a compensator as described above. The printhead 880 may be formed by a 3D printing process (such as by stereolithography).

Although the present disclosure has been described in considerable detail with reference to certain embodiments thereof, other embodiments are possible without departing from the present disclosure. The spirit and scope of the appended claims should not be limited, therefore, to the description of the preferred embodiments contained herein. All embodiments that come within the meaning of the claims, either literally or by equivalence, are intended to be embraced therein. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

We claim:

1. A nozzle for a 3D printing system, the nozzle comprising:
    a flowpath with a material inlet and a material outlet;
    a valve in fluid communication with the flowpath between the material inlet and the material outlet, the valve including a closed state and an open state, wherein in the closed state a diaphragm of the valve is displaced and obstructs the flowpath between the material inlet and the material outlet, and wherein in the open state the material inlet is in fluid communication with the material outlet; and
    a compensator in fluid communication with the flowpath, the compensator including a contracted state associated with the open state of the valve and an expanded state associated with the closed state of the valve, wherein in the contracted state, the compensator provides a portion of the flowpath with a first volume,
    wherein the compensator moves from the contracted state to the expanded state when the valve moves from the open state to the closed state such that a decrease in volume of the flowpath caused by the displacement of the diaphragm when closing the valve is approximately equal to an increase in volume of the flowpath caused by movement of the compensator into the expanded state.

2. The nozzle according to claim 1, further comprising a first pressure control inlet and a second pressure control inlet, wherein the first pressure control inlet is in fluid communication with a chamber of the compensator, and wherein the second pressure control inlet is in fluid communication with a chamber of the valve.

3. The nozzle according to claim 1, the flowpath being a first flowpath, the valve being a first valve, and the compensator being a first compensator, the nozzle further comprising:
    a second flowpath including a material inlet and a material outlet;
    a second valve configured to control the flow of a material through the second flowpath; and
    a second compensator configured to compensate for volumetric variations of the second flowpath due to an operation of the second valve.

4. The nozzle according to claim 3, wherein the first flowpath and the second flowpath converge at a nozzle tip.

5. The nozzle according to claim 3, wherein the nozzle includes a first control inlet and a second control inlet, wherein the first control inlet is in fluid communication with the first compensator and the second valve, and wherein the second control inlet is in fluid communication with the second compensator and the first valve.

6. The nozzle according to claim 1, wherein the diaphragm of the valve includes a displaceable membrane.

7. The nozzle according to claim 1, wherein the compensator includes a displaceable membrane.

8. The nozzle according to claim 1, wherein the nozzle is configured to perform a 3D printing process through movements in one direction, the one direction being a vertical direction.

9. A nozzle for a 3D printing system, the nozzle comprising:
    a flowpath with a material inlet and a material outlet;
    a valve in fluid communication with the flowpath between the material inlet and the material outlet; and
    a compensator in fluid communication with the flowpath in a location between the material inlet and the material outlet,
    wherein the valve includes a first diaphragm moveable between an open state and a closed state, wherein in the closed state the first diaphragm is displaced and obstructs the flow path between the material inlet and the material outlet,
    wherein the compensator includes a second diaphragm moveable between a contracted state and an expanded state, and wherein the second diaphragm moves from the expanded state to the contracted state when the first diaphragm moves from the open state to the closed state such that a change in volume of the flowpath caused by the displacement of the first diaphragm is approximately equal to a change in volume of the flowpath at the second diaphragm.

10. The nozzle of claim 9, wherein a first control inlet is in fluid communication with the valve, and wherein a second control inlet is in fluid communication with the compensator.

11. The nozzle of claim 10, wherein the first diaphragm assumes the closed state when a control pressure is applied to the first control inlet.

12. The nozzle of claim 11, wherein the first diaphragm contacts a valve seat when the first diaphragm is in the closed state.

13. The nozzle of claim 10, wherein the second diaphragm assumes the contracted state when a control pressure is applied to the second control inlet.

14. The nozzle of claim 13, wherein a portion of the flowpath extends around a contact point of the second diaphragm when the second diaphragm is in the contracted state.

15. A nozzle for a 3D printing system, the nozzle comprising:
a flowpath with a material inlet and a material outlet;
a valve in fluid communication with the flowpath between the material inlet and the material outlet, the valve including a closed state and an open state, wherein in the closed state the valve obstructs the flowpath between the material inlet and the material outlet, and wherein in the open state the material inlet is in fluid communication with the material outlet; and
a compensator in fluid communication with the flowpath, the compensator including a contracted state associated with the open state of the valve and an expanded state associated with the closed state of the valve, wherein in the contracted state, the compensator provides a portion of the flowpath with a first volume; and
an actuator for switching a control pressure between the valve and the compensator such that, when the valve moves from the open state to the closed state, the compensator moves from the expanded state to the contracted state simultaneously.

16. The nozzle of claim 15, further comprising a first control inlet and a second control inlet, wherein the first control inlet is in fluid communication with a chamber of the compensator, and wherein the second control inlet is in fluid communication with a chamber of the valve, wherein the first control inlet and the second control inlet are separately controlled.

17. The nozzle of claim 16, wherein the actuator switches the control pressure between the first control inlet and the second control inlet when opening or closing the valve.

* * * * *